United States Patent
Kono et al.

(10) Patent No.: US 11,780,091 B2
(45) Date of Patent: Oct. 10, 2023

(54) ROBOT CONTROL SYSTEM AND ROBOT CONTROL METHOD

(71) Applicant: MITSUBISHI HEAVY INDUSTRIES, LTD., Tokyo (JP)

(72) Inventors: Akira Kono, Tokyo (JP); Takuya Goto, Tokyo (JP); Takeshi Yamada, Tokyo (JP); Katsumi Nakamura, Tokyo (JP); Kazuto Nakamura, Tokyo (JP); Kenichi Tsuruda, Tokyo (JP); Takahiro Inagaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 197 days.

(21) Appl. No.: 16/304,976

(22) PCT Filed: Jun. 8, 2017

(86) PCT No.: PCT/JP2017/021248
§ 371 (c)(1),
(2) Date: Nov. 27, 2018

(87) PCT Pub. No.: WO2017/221717
PCT Pub. Date: Dec. 28, 2017

(65) Prior Publication Data
US 2020/0171665 A1    Jun. 4, 2020

(30) Foreign Application Priority Data
Jun. 20, 2016  (JP) .................................. 2016-121681

(51) Int. Cl.
*B25J 9/16*    (2006.01)
*G05D 1/02*    (2020.01)

(52) U.S. Cl.
CPC ........... *B25J 9/1687* (2013.01); *B25J 9/1612* (2013.01); *B25J 9/1664* (2013.01); *B25J 9/1697* (2013.01); *G05D 1/0251* (2013.01)

(58) Field of Classification Search
CPC ...... B25J 9/1687; B25J 9/1697; B25J 9/1664; B25J 9/1612; G05D 1/0251
(Continued)

(56) References Cited

U.S. PATENT DOCUMENTS

| | | | |
|---|---|---|---|
| 4,954,762 A | 9/1990 | Miyake et al. | |
| 5,380,978 A * | 1/1995 | Pryor ................. | B23K 26/0846 219/121.79 |

(Continued)

FOREIGN PATENT DOCUMENTS

| | | |
|---|---|---|
| DE | 102014018912 A1 | 6/2015 |
| JP | S63-115205 A | 5/1988 |

(Continued)

OTHER PUBLICATIONS

Europe Patent Office, "Search Report for European Patent Application No. 17815186.6," Jun. 7, 2019.
(Continued)

*Primary Examiner* — Khoi H Tran
*Assistant Examiner* — Rodney P King
(74) *Attorney, Agent, or Firm* — Manabu Kanesaka; Benjamin Hauptman; Kenneth Berner (57) ABSTRACT

To provide a robot control system and a robot control method capable of placing a component grasped by a robot hand at an accurate location on another member. A robot control system is provided with: a robot hand configured to grasp a clip; a camera configured to capture an image of the clip grasped by the robot hand, a calculation unit configured to calculate a position of the clip or an inclination of a component based on an imaging result of the clip captured (Continued)

by the camera, and a robot control unit configured to control the robot hand to adjust, based on the position of the clip or the inclination of the component calculated by the calculation unit, a position or an inclination of the robot hand and move the clip to a stringer.

5 Claims, 10 Drawing Sheets

(58) Field of Classification Search
USPC .......................................................... 700/259
See application file for complete search history.

(56) References Cited

U.S. PATENT DOCUMENTS

| | | | |
|---|---|---|---|
| 5,903,459 A | 5/1999 | Greenwood et al. | |
| 5,920,483 A | 7/1999 | Greenwood et al. | |
| 7,233,841 B2* | 6/2007 | Sadighi | H01L 21/681 700/245 |
| 8,280,151 B2* | 10/2012 | Fujieda | G06T 7/75 382/154 |
| 8,290,618 B2* | 10/2012 | Demopoulos | B25J 9/1692 700/245 |
| 8,843,236 B2* | 9/2014 | Barajas | B25J 9/1664 700/253 |
| 9,050,719 B2* | 6/2015 | Valpola | B25J 9/1697 |
| 9,969,131 B2* | 5/2018 | Samak Sangari | B25J 15/0085 |
| 2004/0093119 A1 | 5/2004 | Gunnarsson et al. | |
| 2011/0317879 A1 | 12/2011 | Demopoulos | |
| 2015/0013162 A1 | 1/2015 | Best et al. | |
| 2015/0363935 A1* | 12/2015 | Motoyoshi | G06T 7/75 382/103 |
| 2017/0327246 A1 | 11/2017 | Best et al. | |

FOREIGN PATENT DOCUMENTS

| | | |
|---|---|---|
| JP | H02-202606 A | 8/1990 |
| JP | H03-228589 A | 10/1991 |
| JP | H07-055427 A | 3/1995 |
| JP | 2000-511827 A | 9/2000 |
| JP | 2003-231078 A | 8/2003 |
| JP | 2008-279549 A | 11/2008 |
| JP | 2015-042436 A | 3/2015 |
| WO | 97/046925 A1 | 12/1997 |
| WO | 2001/076830 A1 | 10/2001 |

OTHER PUBLICATIONS

PCT/ISA/210, "International Search Report for International Application No. PCT/JP2017/021248," dated Jul. 11, 2017.
PCT/ISA/237, "Written Opinion of the International Searching Authority for International Application No. PCT/JP2017/021248," dated Jul. 11, 2017.

* cited by examiner

ROBOT CONTROL SYSTEM AND ROBOT CONTROL METHOD

RELATED APPLICATIONS

The present application is National Phase of International Application No. PCT/JP2017/021248 filed Jun. 8, 2017, and claims priority from Japanese Application No. 2016-121681, filed Jun. 20, 2016, the disclosure of which is hereby incorporated by reference herein in its entirety.

TECHNICAL FIELD

The present invention relates to a robot control system and a robot control method.

BACKGROUND ART

When manufacturing the structural body of aircraft components, such as the fuselage and wings of an aircraft, there are cases that other components, such as clips, for example, are attached to long materials such as stringers that constitute the structural body. For example, the clip has an inverted T-shape cross section, and the bottom surface is a flat surface. The bottom surface of the clip is placed on the upper surface of the stringer, a through-hole is formed by a drill in a state in which both are in contact with each other, and subsequently, the stringer and the clip are fastened by a rivet.

In Patent Document 1 described below, it is disclosed that, since large machines, especially large machines with operating ranges that exceed 15 feet, cause errors resulting from thermal expansion and mechanical misalignment between shafts, an interferometer laser tracker or 3D position sensor is used to measure the position of a retroreflector attached to an end effector such as a machine head, and the machine is moved to the correct position prior to machining. In addition, in Patent Document 2 described below, techniques are disclosed for moving, in a manufacturing environment such as an assembly line, objects such as the wings of aircraft that are complicated in shape and difficult to support while accurately maintaining their posture.

CITATION LIST

Patent Document

Patent Document 1: JP 2000-511827 T
Patent Document 2: JP 2015-42436 A

SUMMARY OF INVENTION

Problem to be Solved by the Invention

In cases that a robot having a robot hand grasps a component such as the above-described clip, places the clip or the like on a stringer, and subsequently performs a fastening operation on both, it is possible to save labor in comparison to manual work by operators. In this case, by detecting the position or the inclination of the robot hand with a detection unit of the robot main body, or detecting a reflector installed in the robot hand by a laser tracker, the position or the inclination of the robot hand can be detected.

By contrast, in practice, components such as clips have manufacturing tolerances, and there are deviations in the size and shape of each manufactured component. In addition, when a robot hand grasps a part such as a clip, it is not always possible to grasp the same place each time. That is, the positional relationship and the angle of the clip held by the robot hand are not constant with respect to the robot hand for each operation. For this reason, even in a case where the position of the robot hand can be accurately detected by using the detection unit of the robot or the laser tracker and reflector, as a result of moving the clip or the like onto the stringer, there are cases where the clip cannot be placed at a desired location on the stringer.

The present invention is made in light of the foregoing circumstances, and has an object of providing a robot control system and a robot control method capable of placing a component grasped by a robot hand at a correct location on another member.

Solution to Problem

A robot control system according to a first aspect of the present invention is provided with a robot control system including: a robot hand configured to grasp a component; an imaging unit configured to image the component grasped by the robot hand; a calculation unit configured to calculate, based on an imaging result of the component imaged by the imaging unit, a position of the component or an inclination of the component; and a robot control unit configured to control, based on the position of the component or the inclination of the component calculated by the calculation unit, the robot hand to adjust a position or an inclination of the robot hand and move the component to another member.

According to this configuration, the component grasped by the robot hand is imaged by the imaging unit, and the position or the inclination of the component is calculated based on the imaging result. Next, the position or the inclination of the robot hand is adjusted based on the calculated position or inclination of the component. Then, in a state in which the adjustment result is applied, the robot hand can move the grasped component to another member, and the component grasped by the robot hand is correctly placed on the other member.

In the above-described first aspect, the robot control system may further include a position detection unit configured to detect a position or an inclination of the robot hand and a position or an inclination of the imaging unit, and the robot control unit may control, based on the position or inclination of the robot hand and the position or inclination of the imaging unit detected by the position detection unit, the position or the inclination of the robot hand with respect to the imaging unit.

According to this configuration, the position or the inclination of the robot hand and the position or the inclination of the imaging unit are detected by the position detection unit, and the position or the inclination of the robot hand with respect to the imaging unit is controlled based on the detected position or inclination of the robot hand and the position or inclination of the imaging unit.

In the above-described first aspect, the imaging unit may be a stereoscopic camera, and may be configured to image a bottom surface of the component.

According to this configuration, since the imaging unit is a stereoscopic camera and images the bottom surface, the position or the inclination of the component is detected based on the bottom surface of the component imaged by the imaging unit.

In the above-described first aspect, the robot control unit may be configured to control the robot hand to place the bottom surface of the component on an upper surface of the another member.

According to this configuration, the component is moved to another member by the robot hand, and the bottom surface of the component is placed on the upper surface of another member.

A robot control method according to a second aspect of the present invention includes a step of imaging a component grasped by a robot hand configured to grasp a component; a step of calculating, based on an imaging result of the imaged component, a position of the component or an inclination of the component; a step of adjusting, based on the calculated position of the component or the inclination of the component, a position or an inclination of the robot hand; and a step of controlling the robot hand to move the component to another member.

Advantageous Effect of Invention

According to the present invention, as the position or the inclination of the robot hand is adjusted based on the position or the inclination of the imaged component, the components grasped by the robot hand can be accurately arranged on other members.

DESCRIPTION OF EMBODIMENTS

A robot control system 1 according to an embodiment of the present invention is used when assembling structural bodies of aircraft components, such as the fuselage or main wing of an aircraft. The fuselage, main wing, and the like of the aircraft components are constructed by combining a structural body and a thin plate member (skin), and the structural body is formed by combining multiple structural components. The multiple structural components include stringers, clips, shear ties, frames, and the like.

In the following description, a clip 31 is given as an example of a component, an elongated stringer 32 is given as an example of another member on which a component is arranged, and a case in which the clip 31 is arranged and fastened with respect to the stringer 32 will be described, but the present invention is not limited to these examples. In addition, the application of the present invention is not limited to aircraft components, and the present invention is also applicable to the assembly of other components.

Figure 1:
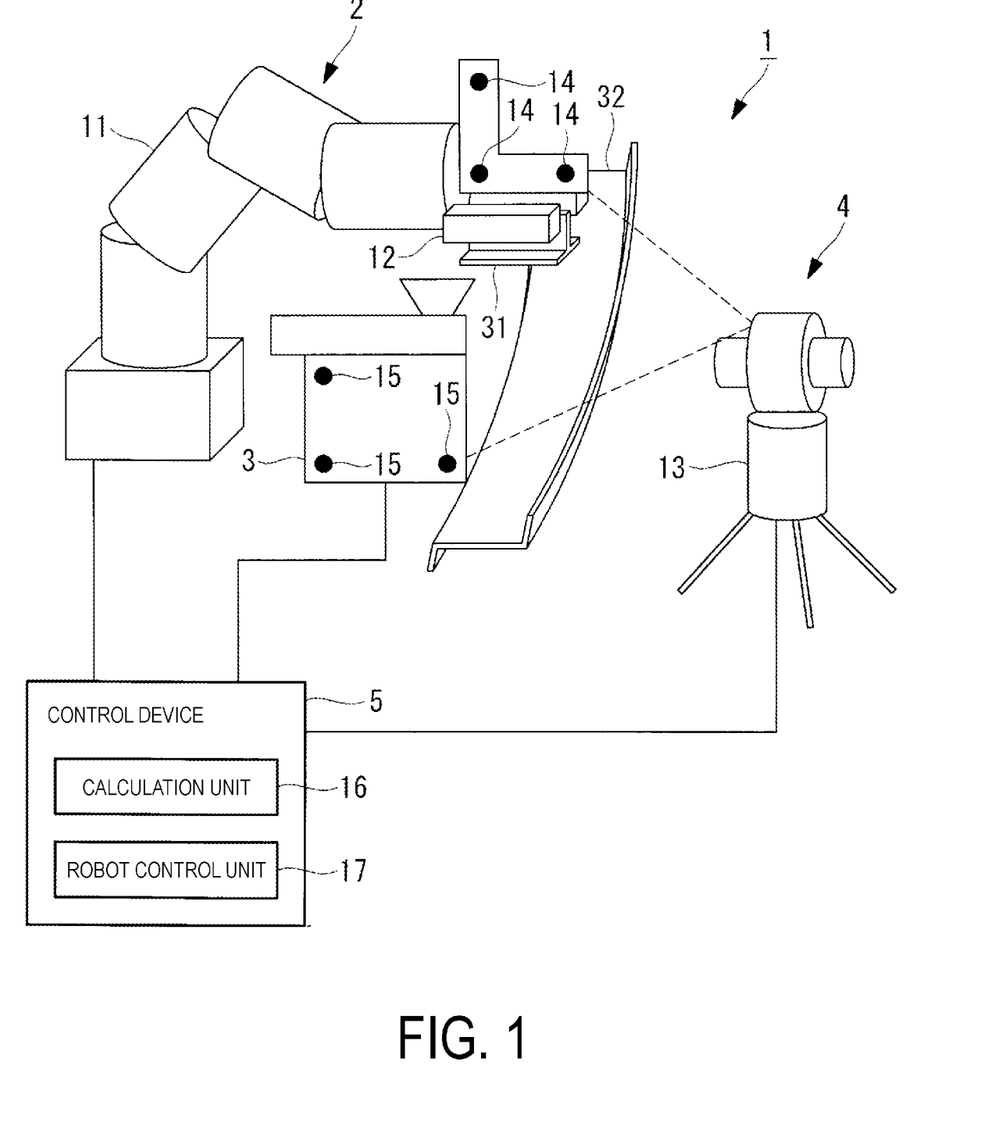
FIG. 1 is a schematic configuration diagram illustrating a robot control system according to an embodiment of the present invention.

The clip 31 has an inverted T-shape transverse cross section, and includes a horizontal plate 31a and an orthogonal plate 31b provided in an orthogonal direction from the middle of the horizontal plate 31a. The bottom surface of the horizontal plate 31a of the clip 31 is placed on the upper surface of the stringer 32, and subsequently, the clip 31 and the stringer 32 are fastened by rivets. As illustrated in FIG. 1, the orthogonal plate 31b can be grasped by the robot hand 12. The stringer 32 has, for example, a Z-shaped cross section, an L-shaped cross section, or the like.

As illustrated in FIG. 1, the robot control system 1 includes a robot 2, a camera 3 that is a stereoscopic camera, a position detection device 4, a control device 5, or the like. The control device 5 is realized by a computer or the like that executes a program.

The robot 2 includes a robot main body portion 11, a robot hand 12, or the like. The robot main body portion 11 supports the robot hand 12, and can adjust the position and the inclination of the robot hand 12. The robot hand 12 can grasp a clip 31 to be installed on the stringer 32, and can release the grasp of the clip 31. The robot 2 grasps a clip 31 placed in a predetermined component storage area, moves the grasped clip 31 to the stringer 32, and subsequently places the grasped clip 31 on the stringer 32.

The camera 3, for example, is a stereoscopic camera, and is capable of 3-dimensionally imaging an imaged target. Data relating to the imaging result imaged and acquired by the camera 3 is transmitted from the camera 3 to the calculation unit 16. The camera 3 is placed at a location where the bottom surface of the clip 31 grasped by the robot hand 12 can be imaged, for example, and the orientation of the lens is adjusted.

The position detection device 4 includes, for example, a laser tracker 13, a reflector 14 installed in the robot hand 12, a reflector 15 installed in the camera 3, and the like.

The laser tracker 13 irradiates laser light to the reflectors 14, 15, and receives laser light reflected by the reflectors 14, 15. The laser tracker 13 can acquire the 3-dimensional position of the reflectors 14, 15 from which the laser light was reflected. As illustrated in FIG. 1, by having three reflectors 14,15 installed in each of the robot hand 12 or the camera 3, in addition to the 3-dimensional position of the robot hand 12, the inclination can also be calculated.

The control device 5 includes a calculation unit 16, a robot control unit 17, and the like.

Based on the data acquired by the camera 3, the calculation unit 16 calculates coordinate information for the clip 31 that serves as the imaging target, and calculates the position and the inclination of the clip 31 with respect to the camera 3.

Based on the 3-dimensional position acquired by the laser tracker 13, the robot control unit 17 adjusts the position of the robot hand 12 with respect to the camera 3, and moves the robot hand 12 to a fixed imaging position.

In addition, based on the position or the inclination of the robot hand 12 with respect to the camera 3 as calculated by the calculation unit 16, the robot control unit 17 adjusts the position or the inclination of the robot hand 12. Further, the robot control unit 17 controls the robot hand 12 to move the clip 31 grasped by the robot hand 12 to the stringer 32 based on the movement path.

Figure 2:
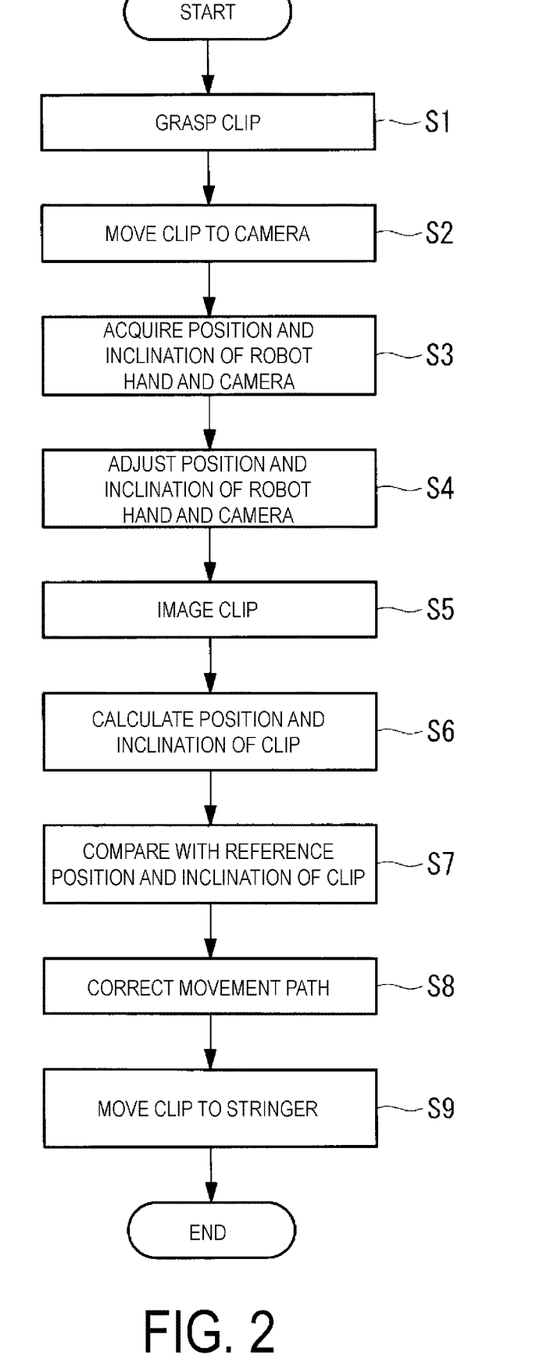
FIG. 2 is a flowchart illustrating a control method of a robot hand using the robot control system according to an embodiment of the present invention.

Next, a control method of the robot hand 12 using the robot control system 1 according to the present embodiment will be described with reference to FIG. 2.

First, the robot hand 12 grasps the orthogonal plate 31b of the clip 31 placed in the predetermined component storage area (Step S1), and the robot hand 12 moves the clip 31 by driving of the robot main body portion 11. The clip 31 is moved within the imaging range of the camera 3 (Step S2).

At this time, the laser tracker 13 is irradiating the laser light, and acquires the 3-dimensional position of the reflectors 14, 15 that reflect the laser light. Based on the 3-dimensional position of the reflector 14 installed in the robot hand 12 and the reflector 15 installed in the camera 3, the position and the inclination of the robot hand 12 and the camera 3 are acquired (Step S3).

Then, based on the 3-dimensional position acquired by the laser tracker 13, the robot control unit 17 adjusts the position and the inclination of the robot hand 12 with respect to the camera 3 (Step S4). At this time, the robot hand 12 is moved to the fixed imaging position, and the robot hand 12 is inclined at a predetermined inclination at the fixed imaging position. By using the laser tracker 13 and the reflectors 14, 15, the position and the inclination of the robot hand 12 can be accurately adjusted.

Next, the camera 3 images the clip 31 grasped by the robot hand 12 (Step S5). Data relating to the imaging result imaged and acquired by the camera 3 is transmitted from the camera 3 to the calculation unit 16.

Subsequently, coordinate information for the clip 31 that serves as the imaging target is calculated by the calculation unit 16 based on the data acquired by the camera 3, and the position and the inclination of the clip 31 with respect to the camera 3 are calculated based on the coordinate information of the clip 31 (Step S6).

Next, the calculated position and inclination of the clip 31 are compared with a reference position or a reference inclination stored in memory in advance (Step S7). As a result of the comparison, a shifted grasp direction and a shift amount with respect to the reference position, as well as an inclination orientation and an inclination amount, are acquired for the clip 31 in the fixed imaging position.

Then, based on the acquired shifted grasp direction and the shift amount and the inclination orientation and the inclination amount of the clip 31, the movement path via which the robot hand 12 moves the clip 31 to the stringer 32 is corrected (Step S8). In the movement path, the position and the angle of the robot hand 12 are adjusted such that the clip 31 grasped by the robot hand 12 is accurately arranged on the stringer 32.

Thereafter, the robot hand 12 moves the clip 31 to the stringer 32 along the corrected movement path (Step S9). In this way, the robot hand 12 can move the grasped clip 31 to the stringer 32, adjust the position and the angle of the clip 31 grasped by the robot hand 12, and accurately place the clip 31 on the stringer 32.

It should be noted that, as described above, instead of correcting the movement path, the position or the inclination of the robot hand 12 may first be adjusted by the robot control unit 17 based on the acquired shifted grasp direction and the shift amount and the inclination orientation and the inclination amount of the clip 31. At this time, the position or the inclination of the robot hand 12 is adjusted such that the clip 31 becomes the same as the reference position or reference inclination stored in memory in advance.

Then, after the position or the inclination of the robot hand 12 is adjusted, the robot hand 12 may move the clip 31 to the stringer 32 along the predetermined movement path. In this case as well, the robot hand 12 can move the grasped clip 31 to the stringer 32, and the clip 31 grasped by the robot hand 12 is accurately placed on the stringer 32.

As described above, according to the present embodiment, even in cases that components such as the clip 31 have manufacturing tolerances and there are deviations in the size and shape of each manufactured component, or in cases that the positional relationship and angle of the clip 31 grasped by the robot hand 12 are not constant with respect to the robot hand 12 for each operation, the position and the angle of the clip 31 are adjusted by the robot. As a result, the clip 31 grasped by the robot hand 12 can be arranged at an accurate position on the stringer 32.

Figure 10A:
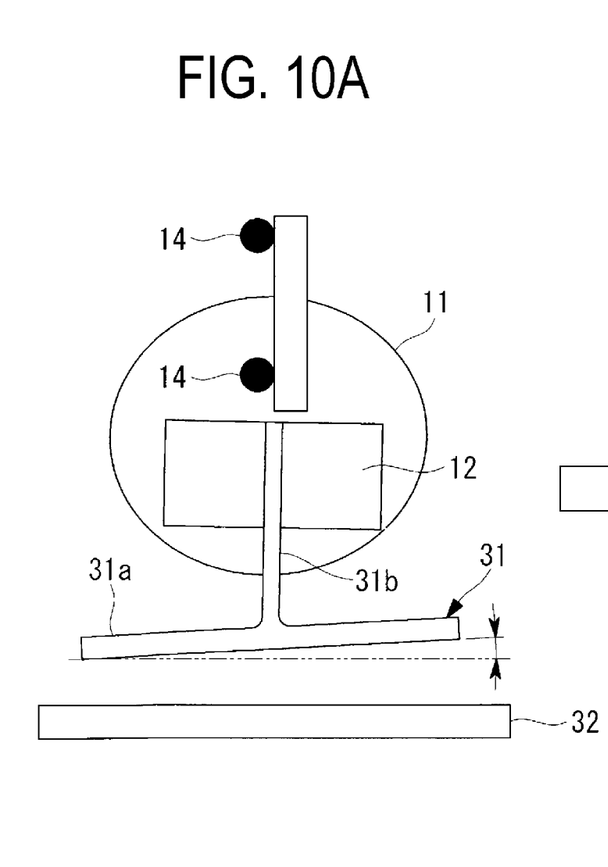
FIG. 10A and FIG. 10B are front views illustrating a robot hand of a robot control system of the related art.
Figure 10B:
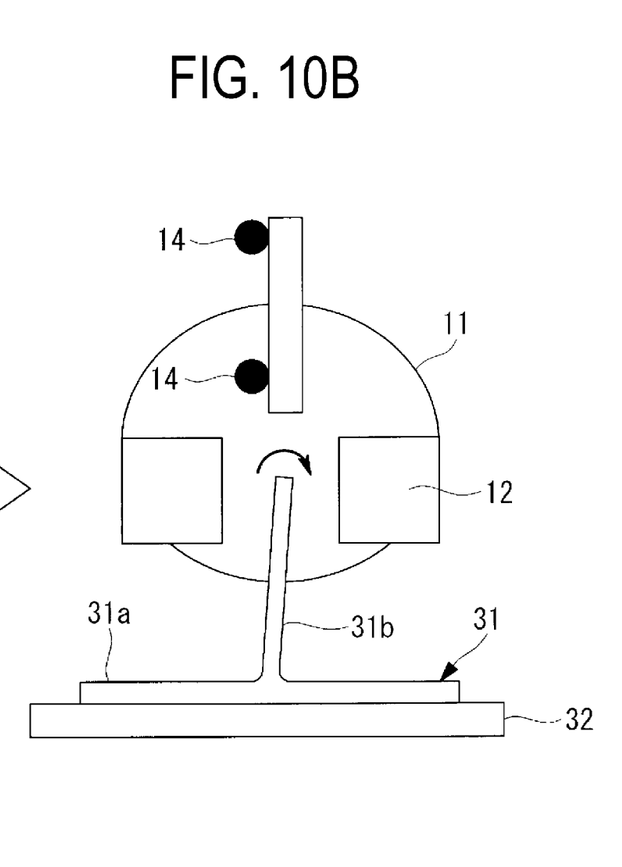

For example, as illustrated in FIG. 10A and FIG. 10B, in cases that the angle of the orthogonal plate 31b with respect to the horizontal plate 31a of the clip 31 is not an accurate 90° due to manufacturing tolerance, the angle of the horizontal plate 31a with respect to the robot hand 12 cannot be ascertained according to the methods of the related art. For this reason, after moving the clip 31 on the predetermined movement path, as illustrated in FIG. 10A, in cases that the bottom surface of the clip 31 is inclined with respect to the upper surface of the stringer 32, positional deviation occurs when the robot hand 12 releases its grasp of the clip 31, as illustrated in FIG. 10B.

Figure 3A:
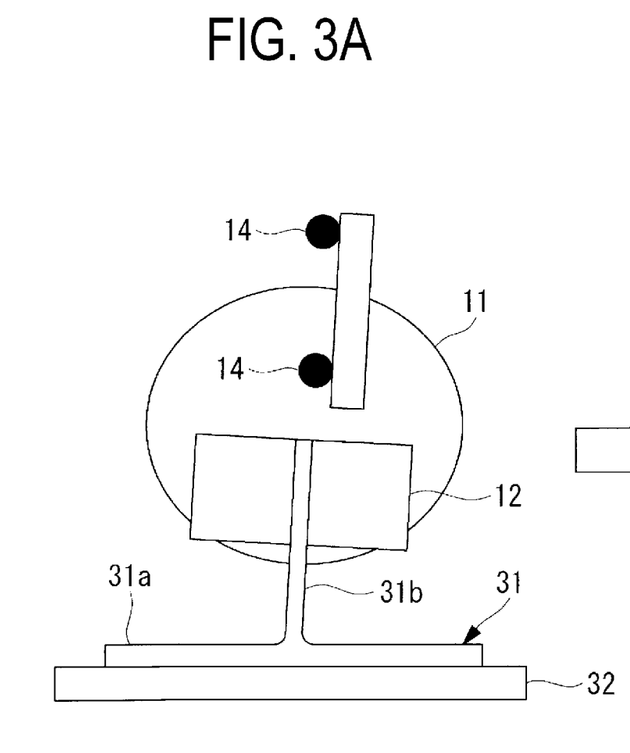
FIG. 3A and FIG. 3B are front views illustrating a robot hand of a robot control system according to an embodiment of the present invention.
Figure 3B:
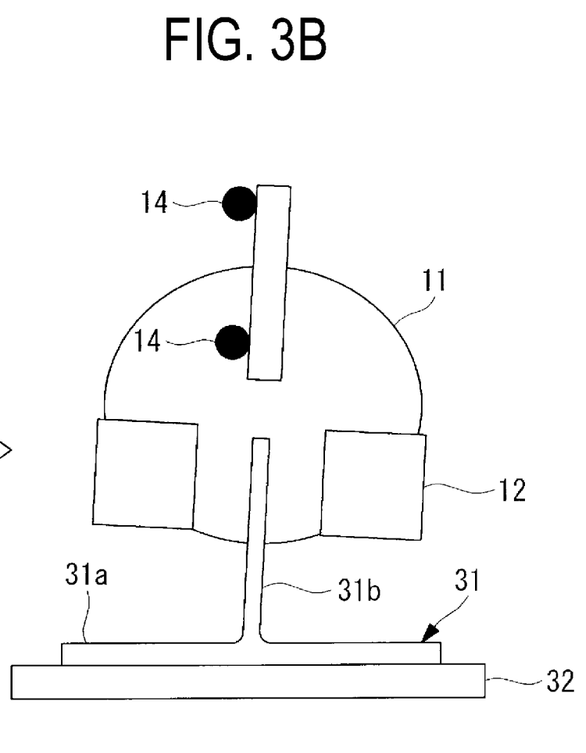

By contrast, in the case of the present embodiment, as illustrated in FIG. 3A, the inclination of the robot hand 12 is adjusted by the robot control unit 17 based on the position and angle of the clip 31 calculated based on the imaging result of the camera 3. At this time, as illustrated in FIG. 3B, by adjusting the inclination of the robot hand 12 such that the bottom surface of the clip 31 is parallel to the upper surface of the stringer 32, no positional deviation occurs when the robot hand 12 releases its grasp of the clip 31.

Figure 4:
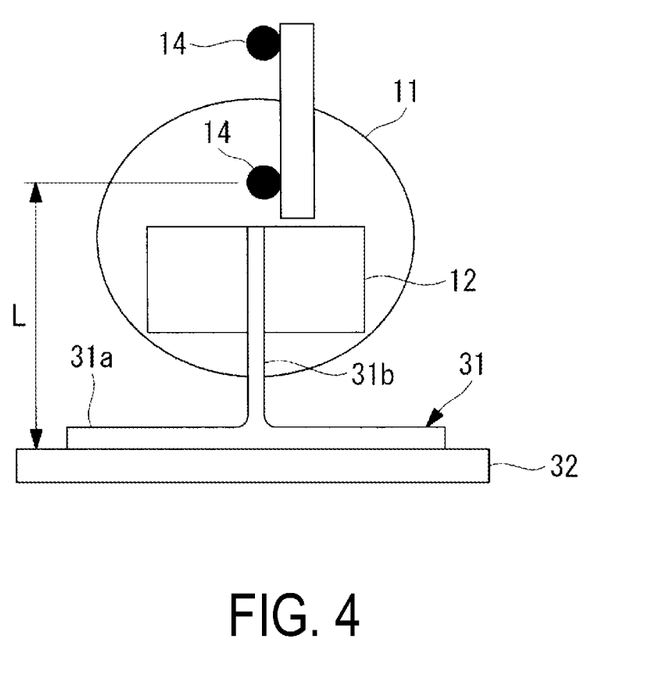
FIG. 4 is a front view illustrating a robot hand of a robot control system according to an embodiment of the present invention.
Figure 7:
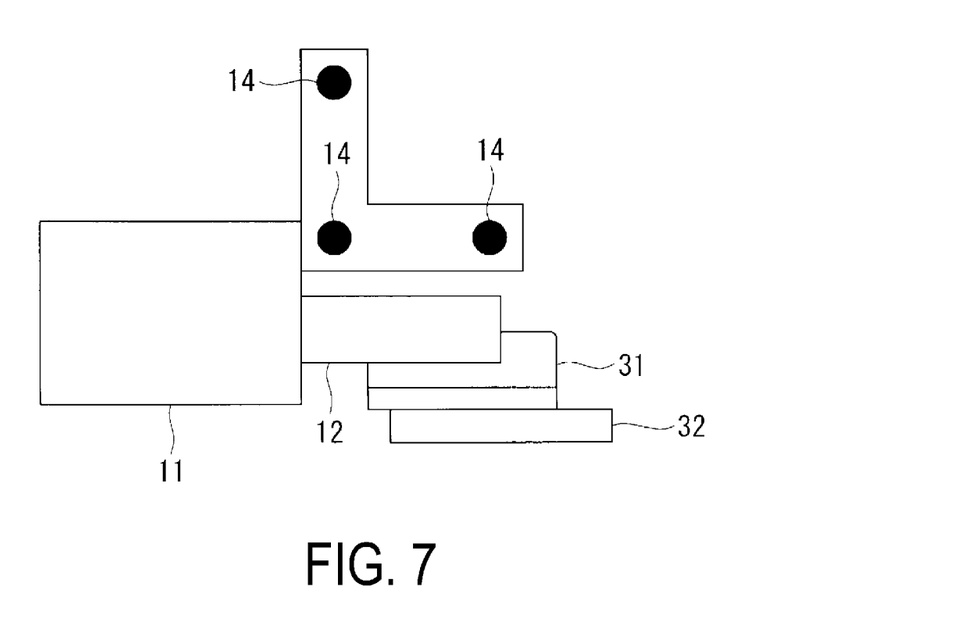
FIG. 7 is a side view illustrating a robot hand of a robot control system according to an embodiment of the present invention.

In addition, as illustrated in FIG. 4, in the case that the robot hand 12 grasps the clip 31 at the original grasping position, in a case where the robot hand 12 is moved such that the distance between the robot hand 12 and the stringer 32 is a predetermined distance (in the example illustrated in FIG. 4, the interval L between the reflector 14 and the bottom surface of the clip 31), the clip 31 can be appropriately arranged on the stringer 32. Also, as illustrated in FIG. 7, in the case that the robot hand 12 grasps the clip 31 at the original grasping angle (for example, in the horizontal direction), in a case where the robot hand 12 is moved such that the angle formed by the robot hand 12 and the stringer 32 becomes a predetermined angle (for example, 0°), the clip 31 can be appropriately arranged on the stringer 32.

Figure 11:
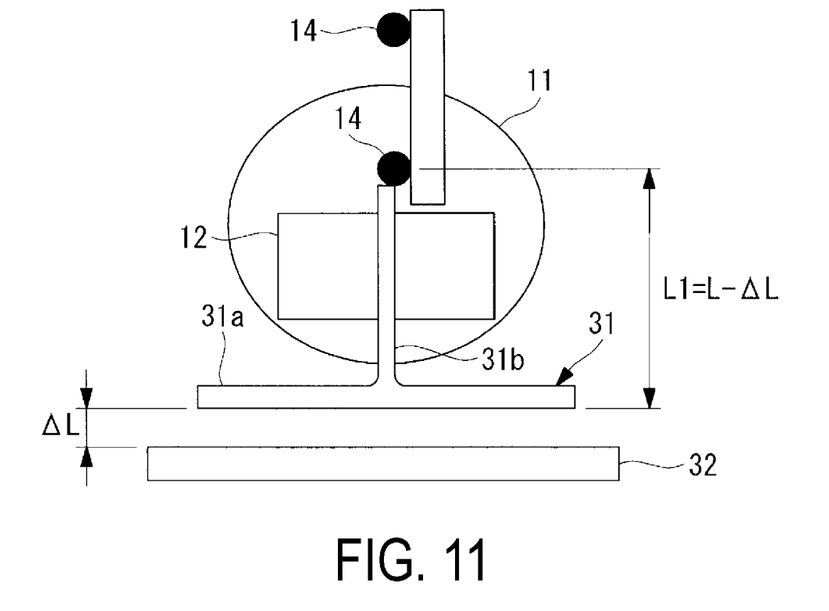
FIG. 11 is a front view illustrating a robot hand of a robot control system of the related art.

By contrast, as illustrated in FIG. 11, when the robot hand 12 grasps the clip 31, in a case that a position different than the original grasping position is grasped (in the example illustrated in FIG. 11, the interval L1 (=L−ΔL) between the reflector 14 and the bottom surface of the clip 31), the position of the clip 31 with respect to the robot hand 12 cannot be ascertained according to the methods of the related art. For this reason, when the robot hand 12 is moved on a predetermined movement path, a ΔL occurs in the space between the upper surface of the stringer 32 and the bottom surface of the clip 31.

Figure 12:
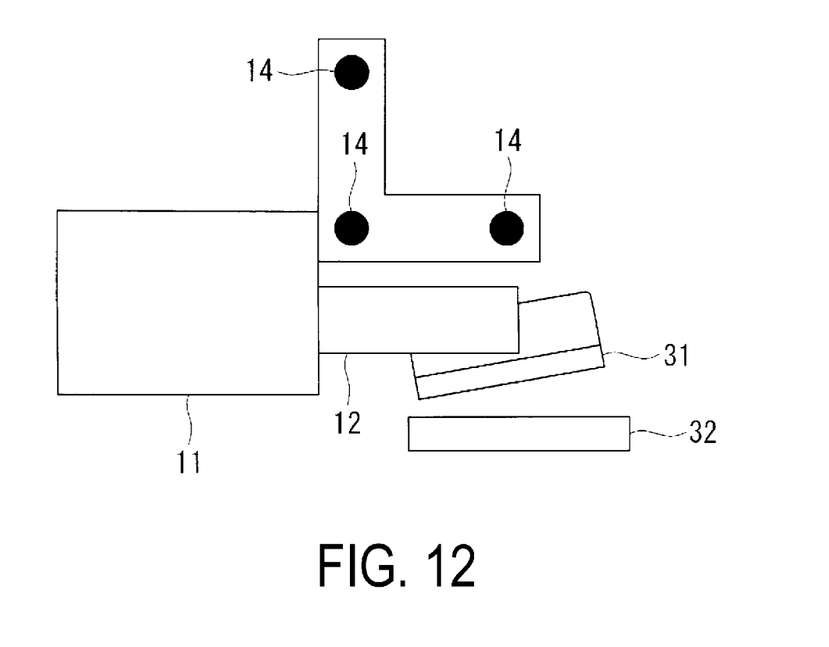
FIG. 12 is a side view illustrating a robot hand of a robot control system of the related art.

In addition, as illustrated in FIG. 12, when the robot hand 12 grasps the clip 31, in a case that the clip 31 is grasped at an inclination different than the original inclination (for example, the horizontal direction), the inclination of the clip 31 with respect to the robot hand 12 cannot be ascertained according to the methods of the related art. For this reason, when the robot hand 12 is moved on a predetermined movement path, the position of the clip 31 on the stringer 32 may become a position further away from the stringer 32, or the clip 31 may tilt.

As described above, in cases that there is a gap between the clip 31 and the stringer 32, and they are inclined relative to each other, when drilling holes for rivets in both the clip 31 and the stringer 32, problems arise in which the position of the hole of the clip 31 shifts with respect to the stringer 32, or the shape of the hole becomes elliptical. In addition, on the contrary, in a case that the bottom surface of the clip 31 is moved to a position lower than the upper surface of the stringer 32, a problem arises in which the clip 31 is pushed too far against the stringer 32.

Figure 5:
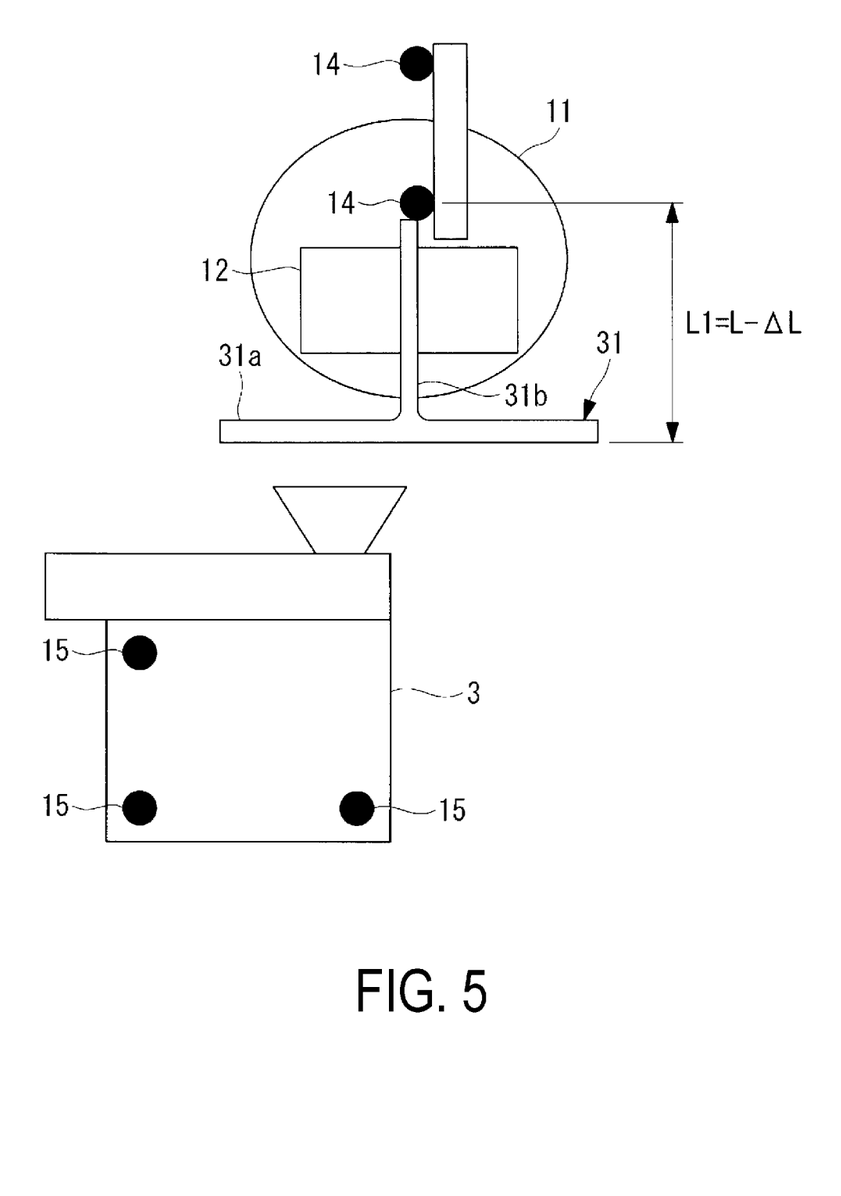
FIG. 5 is a front view illustrating a robot hand and a camera of a robot control system according to an embodiment of the present invention.
Figure 6:
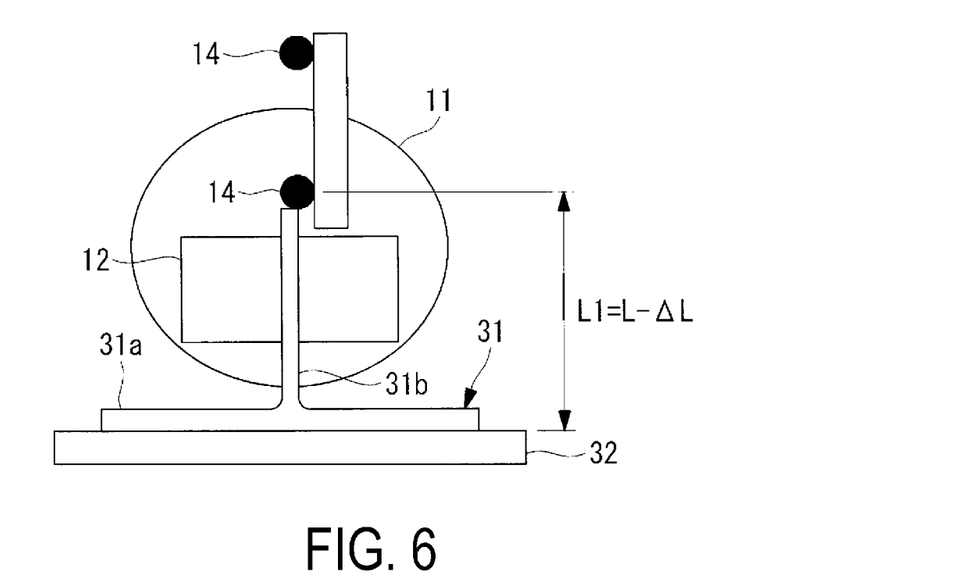
FIG. 6 is a front view illustrating a robot hand of a robot control system according to an embodiment of the present invention.

In contrast, in the case of the present embodiment, as illustrated in FIG. 5, after the position of the clip 31 is detected by the camera 3, as illustrated in FIG. 6, the position of the robot hand 12 is adjusted by the robot control unit 17 based on the position of the clip 31 calculated based on the imaging result of the camera 3. The position of the robot hand 12 is adjusted such that the bottom surface of the clip 31 becomes parallel to the upper surface of the stringer 32, and the stringer 32 and the clip 31 properly contact each other.

Figure 8:
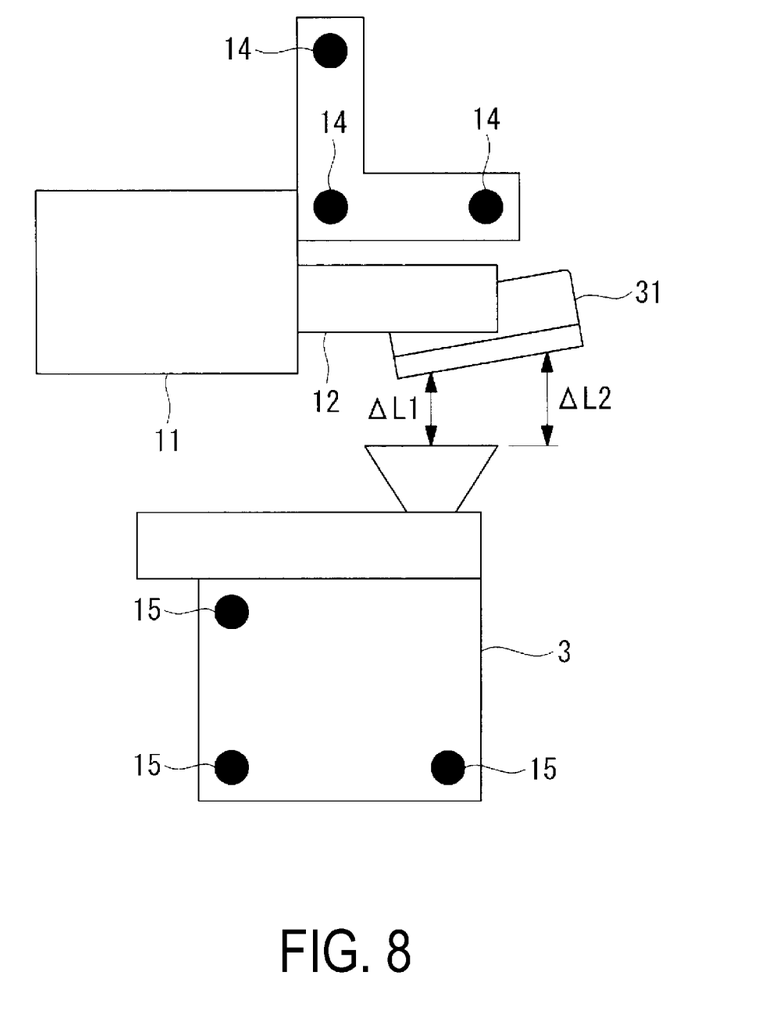
FIG. 8 is a side view illustrating a robot hand and a camera of a robot control system according to an embodiment of the present invention.
Figure 9:
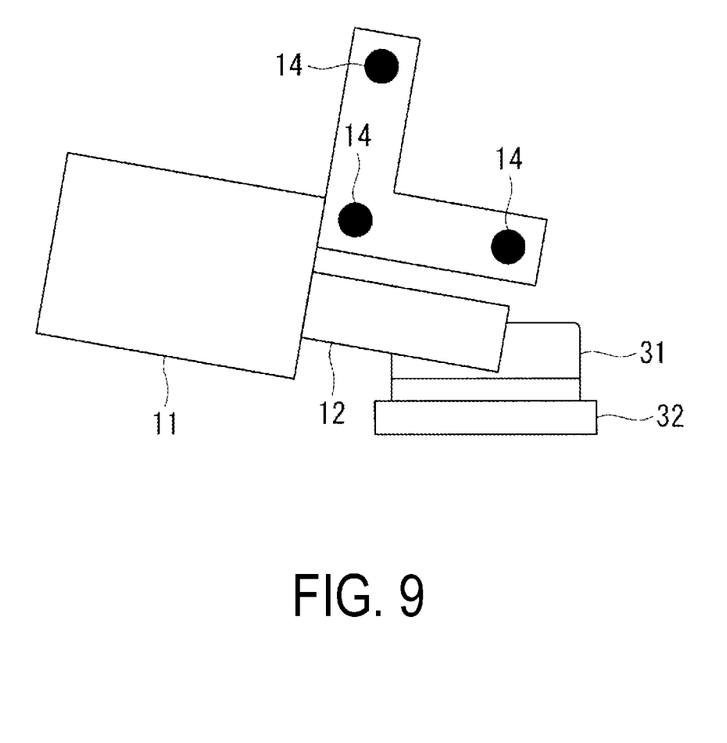
FIG. 9 is a side view illustrating a robot hand of a robot control system according to an embodiment of the present invention.

In addition, in the case of the present embodiment, as illustrated in FIG. 8, after the position of the clip 31 is detected by the camera 3 (ΔL1≠ΔL2), as illustrated in FIG. 9, the angle of the robot hand 12 is adjusted by the robot control unit 17 based on the angle of the clip 31 calculated based on the imaging result of the camera 3. The inclination of the robot hand 12 is adjusted such that the bottom surface of the clip 31 becomes parallel to the upper surface of the stringer 32, and the stringer 32 and the clip 31 properly contact each other. As a result, the clip 31 can be accurately positioned with respect to the stringer 32, and accurate hole-drilling can be performed.

As described above, according to the present embodiment, the clip 31 can be arranged at an accurate position with respect to the stringer 32. In addition, in a case that hole-drilling is simultaneously performed for both the clip 31 and the stringer 32, hole drilling can be performed to create an accurate circular shape without causing positional deviation.

REFERENCE SIGNS LIST

1 Robot control system
2 Robot
3 Camera
4 Position detection device
5 Control device
11 Robot main body portion
12 Robot hand
13 Laser tracker
14 Reflector
15 Reflector
16 Calculation unit
17 Robot control unit
31 Clip
31a Horizontal plate
31b Orthogonal plate

The invention claimed is:

1. A robot control system comprising:
a robot hand configured to grasp a component;
an imaging unit arranged to be spaced apart from the robot hand and configured to image the component grasped by the robot hand;
a calculation unit configured to calculate, based on an imaging result of the component imaged by the imaging unit, a position of the component or an inclination of the component;
a robot control unit configured to control the robot hand;
a first reflector installed in the robot hand;
a second reflector installed in the imaging unit; and
a laser tracker configured to irradiate laser light to the first reflector and the second reflector, receive laser light reflected by the first reflector and the second reflector, acquire a 3-dimensional position and an inclination of the first reflector and the second reflector, and detect a position or an inclination of the robot hand and a position or an inclination of the imaging unit,
wherein the robot control unit is configured to:
move the robot hand grasping the component to an imaging range of the imaging unit,
adjust the position and the inclination of the robot hand so that the robot hand is inclined with respect to the imaging unit at a predetermined inclination at a fixed imaging position, based on each 3-dimensional position information of the first reflector and the second reflector detected by the laser tracker,
then, acquire a shift amount of the component with respect to a reference position and a reference inclination of the component, by using a calculation result of the calculation unit based on the imaging result of the component imaged by the imaging unit at the fixed imaging position, and
move the component to a member on which the component is to be arranged, with the robot hand whose position and inclination are adjusted based on the acquired shift amount of the component.

2. The robot control system according to claim 1, wherein the imaging unit is a stereoscopic camera, and is configured to image a bottom surface of the component.

3. The robot control system according to claim 1, wherein the robot control unit is configured to control the robot hand to place a bottom surface of the component on an upper surface of the member.

4. A robot control method comprising:
a step of moving a robot hand grasping a component to an imaging range of an imaging unit,
a step of imaging, by the imaging unit, the component grasped by the robot hand configured to grasp the component, the imaging unit being arranged to be spaced apart from the robot hand;
a step of calculating, based on an imaging result of the imaged component, a position of the component or an inclination of the component;
a step of adjusting, based on the calculated position of the component or the inclination of the component, a position or an inclination of the robot hand;
a step of irradiating laser light to a first reflector installed in the robot hand and a second reflector installed in the imaging unit, receiving laser light reflected by the first reflector and the second reflector, acquiring a 3-dimensional position and an inclination of the first reflector and the second reflector, and detecting a position or inclination of the robot hand and a position or an inclination of the imaging unit by a laser tracker; and a step of adjusting the position and the inclination of the robot hand, so that the robot hand is inclined with respect to the imaging unit at a predetermined inclination at a fixed imaging position, based on each 3-dimensional position information of the first reflector and the second reflector detected by the laser tracker, after the step of adjusting the position and the inclination of the robot hand, a step of acquiring a shift amount of the component with respect to a reference position and a reference inclination of the component, by using a calculation result of the calculation unit based on an imaging result of the component imaged by the imaging unit at the fixed imaging position, and a step of moving the component to a member on which the component is to be arranged, with the robot hand whose position and inclination are adjusted based on the acquired shift amount of the component.

5. The robot control system according to claim 1, wherein the robot control unit is configured to correct a movement path to move the component to a member on which the component is to be arranged, based on the shift amount of the component acquired from the calculation result of the calculation unit.

* * * * *